June 20, 1939.  H. W. SIMPSON  2,162,979
POWER TAKE-OFF
Filed May 5, 1936  5 Sheets-Sheet 1

INVENTOR.
HOWARD W. SIMPSON.
BY Barnes, Kisselle, Laughlin & Raisch
ATTORNEYS.

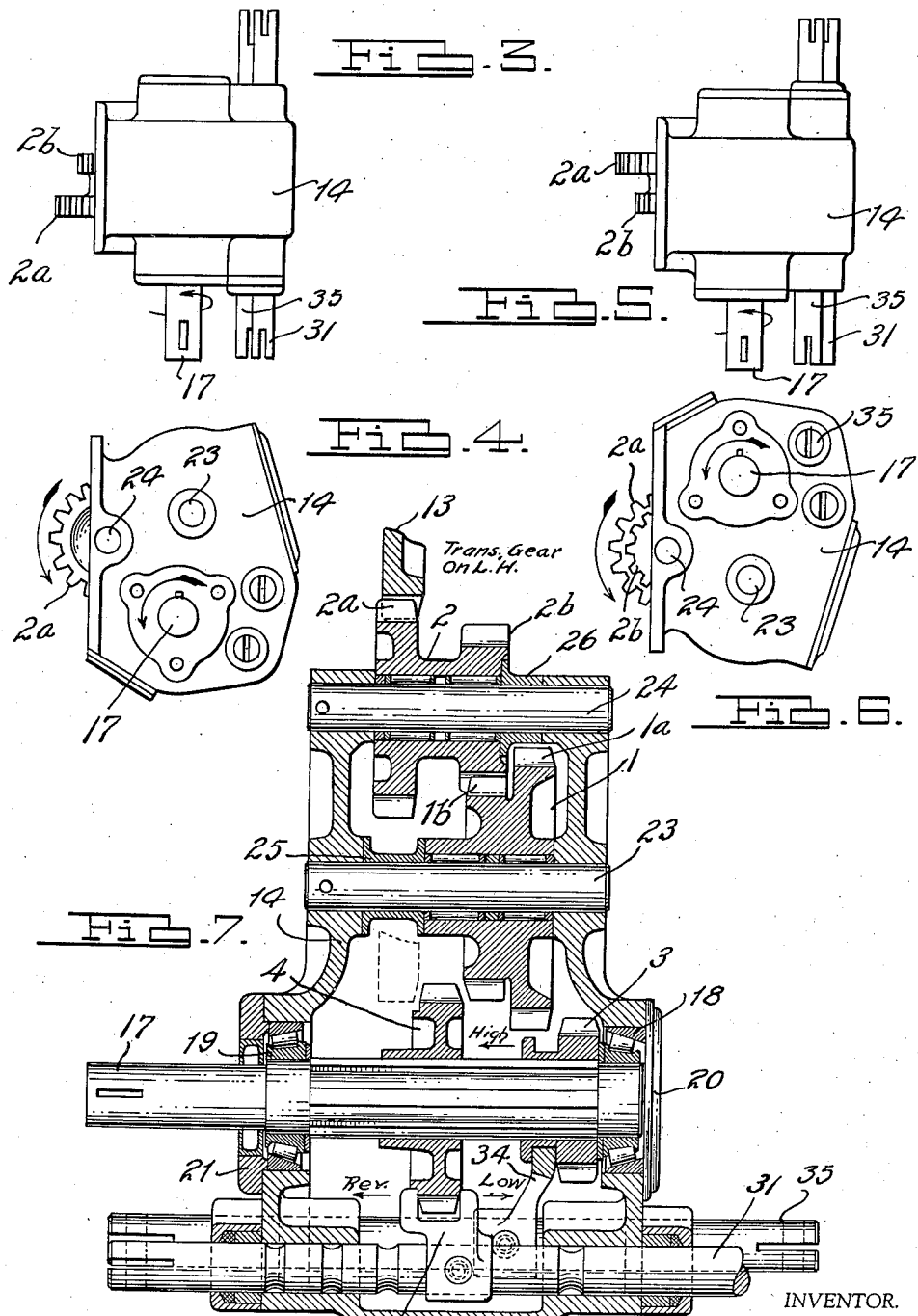

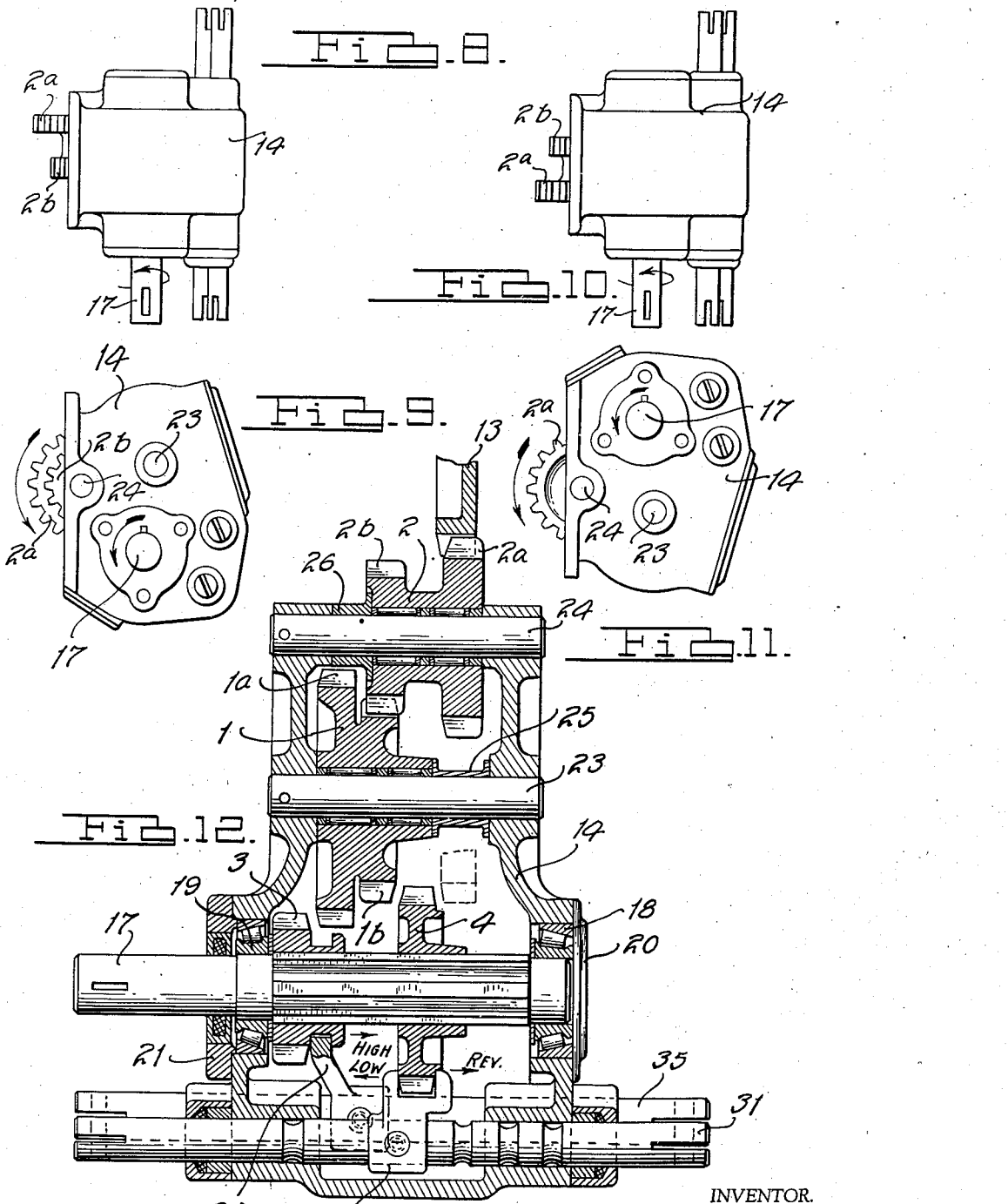

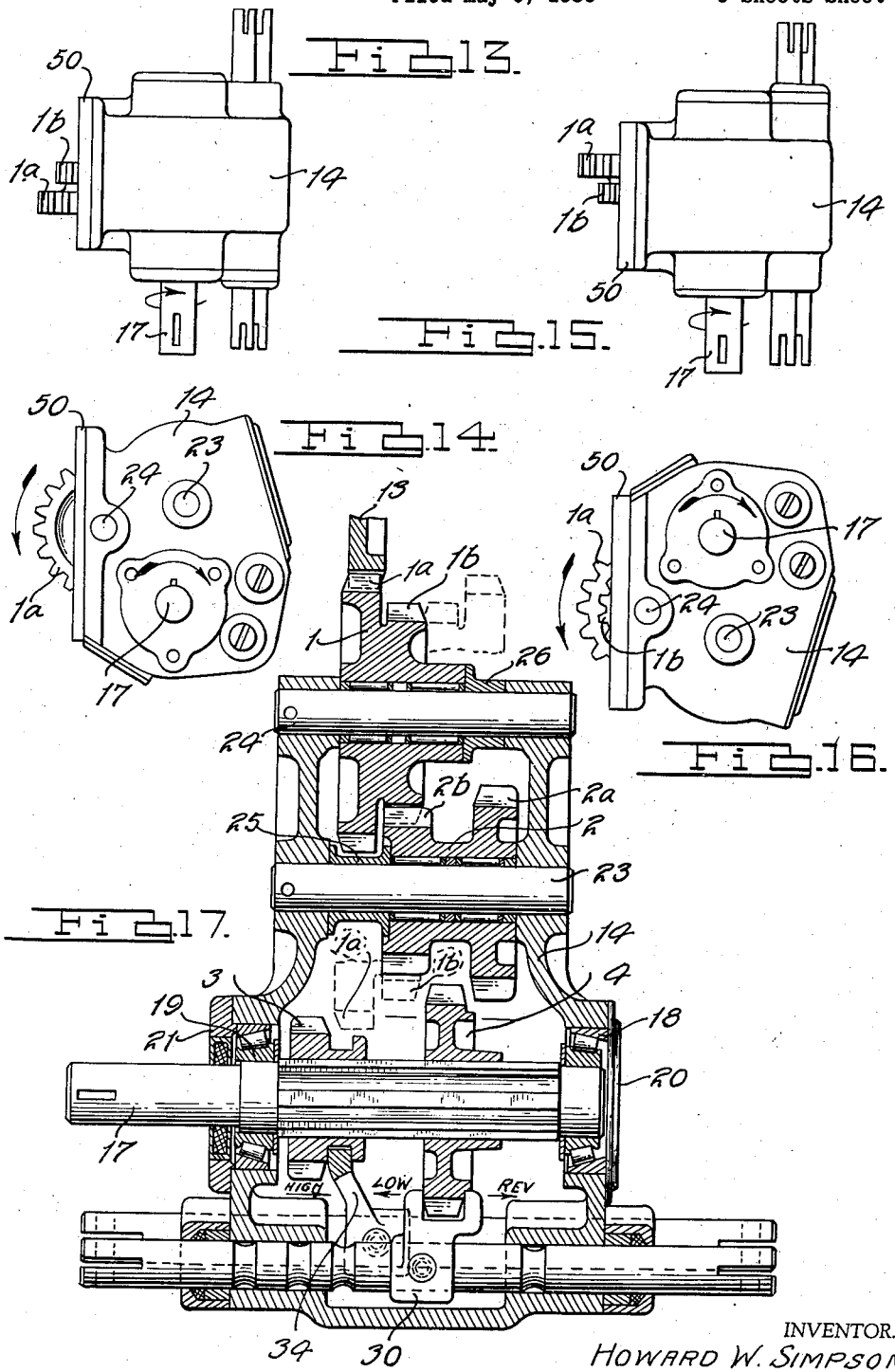

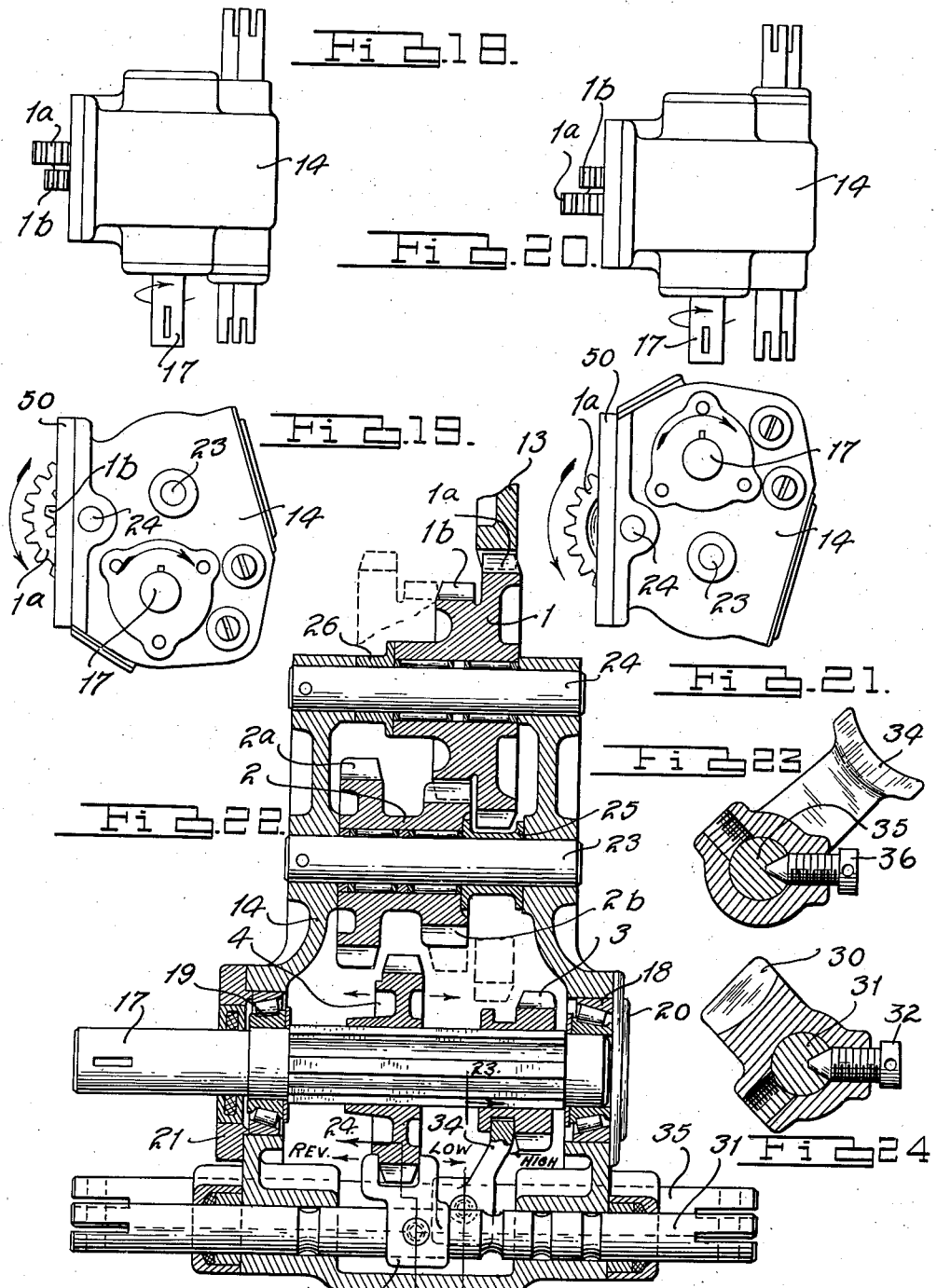

Patented June 20, 1939

2,162,979

UNITED STATES PATENT OFFICE 2,162,979

POWER TAKE-OFF

Howard W. Simpson, Dearborn, Mich.

Application May 5, 1936, Serial No. 77,997

5 Claims. (Cl. 74—342)

This invention relates to a power take-off, and more particularly to a power take-off which is adapted for use with the transmission of an automotive vehicle.

Inasmuch as the power take-off usually does not come as standard equipment with the motor vehicle and must be purchased as an accessory, and since the position of the gear in the motor vehicle transmission with which the power take-off meshes is different in one make of car than another, it is desirable from the manufacturing standpoint to produce a power take-off which is universally applicable to all makes of motor vehicle transmissions. It is one of the objects of this invention to produce a power take-off which can be used with transmissions of different makes of automotive vehicles.

It is also an object of this invention to produce a power take-off which by a proper interchange of the parts can be adapted to suit the individual requirements of the owner as to gear ratios and the direction of rotation and position of the power take-off shaft when in high, low or reverse speeds.

The power take-off can be assembled to either the right or left side of the transmission, with the gear on the transmission on either the right or left side of the opening. On either side of the transmission the power take-off shaft can be extending forward or to the rear and can be above or below the center of the power take-off opening as desired. In any of these positions two speeds forward and one reverse can be obtained or two speeds reverse and one forward. The shifter control can be attached to either the front or rear in any of the mounting positions. All above variations are obtained with the same parts in the power take-off, it being only necessary to rearrange them to obtain the variations.

In the drawings:

Figs. 3 and 4 are plan and side elevational views respectively showing the power take-off arranged for transmissions with the gear in the transmission from which the power is taken on the left hand side of the opening and the power take-off shaft below center, two speeds in the direction shown by the arrow and one opposite.

Figs. 5 and 6 are plan and side elevational views respectively showing the power take-off arranged for transmissions with the gear in the transmission from which the power is taken on the right hand side of the opening and the power take-off shaft above center, two speeds in the direction shown by the arrow and one opposite.

Fig. 7 is a section along the line 7—7 of Fig. 1 and corresponds to Figures 3 through 6.

Figs. 8 and 9 show the power take-off with the parts arranged for transmissions with the gear on the right hand side of the opening, the power take-off shaft below center, two speeds in the direction of the arrow and one opposite.

Figs. 10 and 11 show the power take-off with the parts arranged for transmissions with the gear on the left hand side of the opening, the power take-off shaft above center, two speeds in the direction of the arrow and one opposite, with the power take-off upside down.

Fig. 12 is a sectional view corresponding to Figs. 8 through 11.

Figure 1:
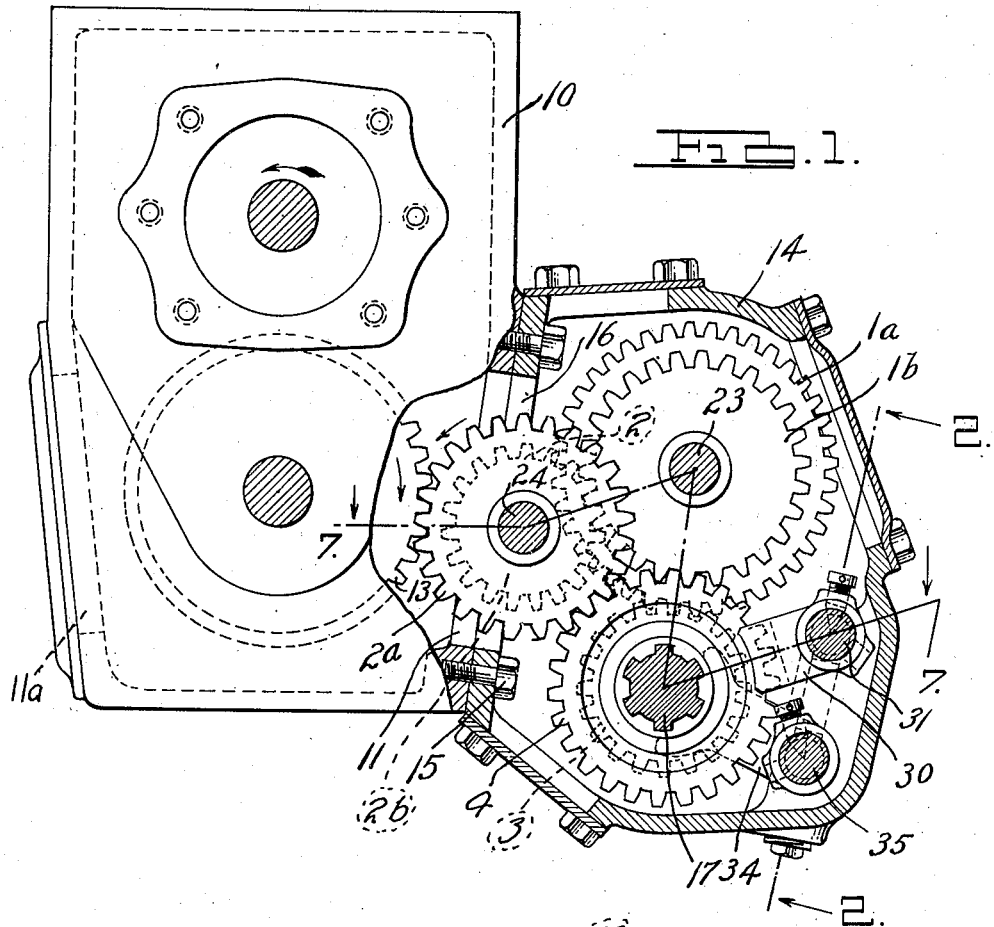
Fig. 1 is a vertical section through the power take-off assembled to the transmission of an automotive vehicle.

Figs. 13, 14, 15 and 16 correspond to Fig. 17.

Figs. 13 and 14 are plan and side elevational views showing the position of the parts of the power take-off arranged for transmissions with the gear from which power is taken on the left hand side of the opening, the power take-off shaft below center, two speeds in direction shown by the arrow, one speed in the opposite direction.

Figs. 15 and 16 are plan and side elevational views showing the position of the parts of the power take-off arranged for transmissions with the gear from which power is taken on the right hand side of the opening, the power take-off shaft above center, two speeds in the direction shown by the arrow, and one opposite, with the power take-off upside down.

Fig. 17 is a section similar to Figs. 7 and 12 but with some of the gears transposed.

Figs. 18, 19, 20 and 21 correspond to Fig. 22.

Figs. 18 and 19 show the power take-off with the parts arranged for transmissions with the gear on the right hand side of the opening, the power take-off shaft below center, speeds in the direction shown and one opposite.

Figs. 20 and 21 show the power take-off with the parts arranged for transmissions with the gear on the left hand side of the opening, the power take-off shaft above center, two speeds in the direction shown, and one opposite.

Fig. 22 is a section similar to Fig. 17 but with the transmission gear on the right side of the opening.

Figs. 23 and 24 are sections along the lines 23—23 and 24—24 respectively of Fig. 22.

Referring more particularly to the drawings there is shown a housing 10 for any of the well-known selective, shifting gear or other type of automotive transmission. This housing 10 is provided with an opening 11 in its right wall through which the connection is made between the power take-off and one of the gears 13 of the automotive transmission. An opening 11a for a similar purpose is shown in the left side wall.

The power take-off comprises a housing 14 which is secured by the bolts 15 to the housing 10. The housing 14 is provided with an opening 16 of the same size and located to coincide with the opening 11 in the housing 10.

The power take-off is provided with a shaft 17 which is supported by the roller bearing races 18 and 19 carried by the side walls of the housing 14. The roller bearing races 18 and 19 are held in position by the removable plates 20 and 21.

The shaft 17 is hereinafter referred to as the power take-off shaft and may be connected in any suitable manner with whatever mechanism it is desired to drive by means of the power take-off. The power take-off shaft 17 has splined thereon the sliding gears 3 and 4.

The housing 14 also has mounted therein the counter-shafts 23 and 24 which support the gears 1 and 2 respectively. Gears 1 and 2 are supported on the shafts 23 and 24 by suitable needle bearings and are held in position by the spacers 25 and 26 respectively. Gears 1 and 2 are each double gears and each comprise two gears homogeneously or otherwise formed, one of which has a larger diameter than the other. In double gear 1 the large gear is referenced 1a and the small gear 1b. In double gear 2 the large gear is referenced 2a and the small gear 2b. As shown in Fig. 1, shafts 23 and 24 are equidistant from shaft 17. It is essential that the distance between shaft 23 and 17 be equal to the distance between shaft 24 and 17 so that gears 1 and 2 can be interchanged to effect certain desirable results described below. Shafts 23 and 24 are mounted in the casing 14 so that they are readily removable. The same is true of shaft 17.

The sliding gear 4 is arranged to be shifted by a shifter fork 30 which is mounted upon the sliding shaft 31 and held in position by a set screw 32 which engages a conical opening 33 in the shaft 31. Sliding gear 3 is arranged to be shifted by a shifter fork 34 adjustably mounted on the sliding shaft 35. Shifter fork 34 is keyed to the shaft 35 by means of the set screw 36 which engages the shaft 35 in either conical opening 37 or conical opening 38. The two shifter forks each have two threaded set screw holes with axes in the same plane, as shown in Figs. 23 and 24. This enables insertion of the set screw from the top when the forks are turned about.

Figure 2:
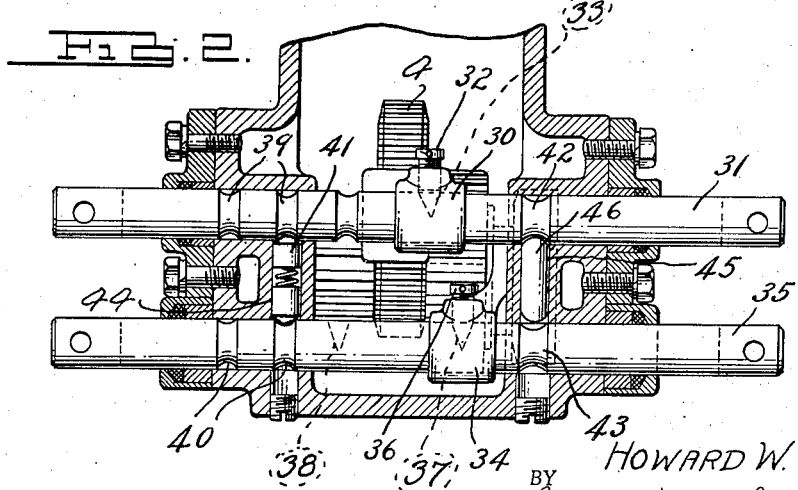
Fig. 2 is a section along the line 2—2 of Fig. 1.

Shifter shaft 31 is provided with three spaced annular grooves 39, and shifter shaft 35 with two spaced annular grooves 40 which are arranged to be engaged by the spring and plunger detent 41 to hold the shafts 31 and 35 in any one of their adjusted positions. Shafts 31 and 35 are also provided with circumferential grooves 42 and 43. The housing 14 is symmetrical so that the cylindrical opening 44 which houses the spring and plunger detent 41 has its counterpart in the cylindrical opening 45 which houses the cylindrical pin 46. The openings 44 and 45 are each closed by a screw-threaded plug. The pin 46 has its ends rounded so that whenever one or the other of the shafts 31 or 35 is shifted, the pin 46 engages the other shaft in one or the other of the openings 42 to hold this shaft against shifting. Thus, as shaft 31 is shifted, groove 42 will cam pin 46 downwardly, as viewed in Fig. 2, into engagement with groove 43 and shaft 35. At the same time groove 42 will be offset from pin 46 and the ungrooved portion of the shaft 31 will lock the pin 46 in interengagement with shaft 35 in the groove 43. This arrangement permits the operator to shift but one of the gears 3 and 4 at a time and positively prevents the simultaneous shifting of gears 3 and 4.

As shown in Figs. 1 and 7, gear 2a is meshed with the transmission gear 13 from which the power is taken. Gear 13, as shown in these views, is on the left hand side of the opening 11 in the transmission housing 10. As viewed in Figs. 3 and 4, the power take-off shaft 17 is below the center of the housing 14. It will be noted that gear 2b meshes with gear 1b. If gear 3 is shifted into mesh with gear 1a, the power shaft 17 will rotate in high speed in the direction indicated by the arrow, Fig. 4. If the gear 4 is shifted into mesh with gear 1b, the shaft 17 will rotate in low speed in the same direction as indicated by the arrow, Fig. 4. If gear 4 is shifted to the left and meshed with gear 2a, the power take-off shaft will rotate clockwise in the opposite direction to that indicated by the arrow in Fig. 4. Thus, as shown in Figs. 3 and 4, one obtains high and low speeds with the power take-off shaft 17 rotating in the direction of the arrow, Fig. 4, and one reverse speed.

If the transmission gear 13 is on the right hand side of the opening 11 in the housing 10, then as shown in Figs. 5 and 6, the power take-off is turned upside down. The gears 1 and 2 and all other parts remain in the same position as shown in Fig. 7 except the shaft 17 which is turned end for end if desired in order to make it extend toward the rear of the vehicle as before. With this arrangement the power shaft 17 is above the center of the power take-off housing 14. The shaft 17 rotates in the same direction as that shown in Fig. 4.

If one wishes to have the power take-off shaft 17 below the center of the power take-off housing 14 and the transmission gear 13 is on the right hand side of the opening, then the gear 2 is turned about on shaft 24, as shown in Fig. 12, and gear 1 is likewise turned about on shaft 23. The spacers 26 and 25 are likewise moved from one side to the other of their respective gears. Gears 3 and 4 change places and are turned end for end, as shown in Fig. 12, so that gear 3 is now on the left hand side of gear 4. However, gear 3 is still adapted to mesh with gear 2a and 1b. Since the position of gears 3 and 4 has been changed, this necessitates turning the shifter shaft 31 and fork 30 end for end and shaft 35 and fork 34 end for end, as shown at Fig. 12. To turn the shafts 31 and 35 end for end it is necessary to release the set screws 32 and 36 which permit the shafts to be withdrawn from the shifter forks and the power take-off housing and turned end for end before they are reinserted through the openings in the housing 14. This also permits the plunger 46 to be interchanged with detent 41. The shifter forks 30 and 34 are turned about after the shafts 31 and 35 have been turned end for end and the shafts are then slid through the forks 30 and 34 whereupon the set screws 32 and 36 are turned down to lock the shifter forks to their respective shafts. The two set screws lock into the same two conical holes in their shafts as in Fig. 7. The shifter forks 32 and 36 however maintain the same relative position on their shafts 31 and 35 that they did previously, as shown in Fig. 7.

It is usual to consider direction of rotation forward when it is the same as that of the crankshaft of the engine. As shown in Figs. 1 through 12 the gear ratio (that is, the speed of the power take-off shaft 17 to that of gear 2) in high forward gear is about 130%, low forward gear about 71%, reverse gear about 95%. If it is desired to obtain two speeds in reverse and one forward, this can be accomplished by transferring gear 1 on to shaft 24 and gear 2 on to shaft 23, as shown in Figs. 17 and 22. At this time gear 3 is positioned on the left hand side of gear 4 on the power take-off shaft 17. In high reverse gear the drive is from gear 13 through gear 1a to gear 3 which is meshed with gear 1a. In low reverse, gear 1b meshes with 4. In forward, gear 1b meshes with 2b and 2a meshes with 4. In Fig. 17 shifter shafts 31 and 35 are put in the same position as in Fig. 7, but forks 30 and 34 are turned about. Fork 30 is locked to the shaft at the same conical set screw hole 33 as in Fig. 7, but fork 34 is moved to the right and its set screw locks into conical hole 37 instead of 38. Of course, every time a fork is turned about it is necessary to screw the set screw into the other hole tapped in the fork so as to keep the head of the screw on the top where it can be reached.

When the large gear 1 is mounted on shaft 24 it is necessary to provide a spacer 50 (Fig. 14) between the power take-off housing 14 and the transmission housing 10 to provide for the difference in radius between gear 1a and gear 2a. With this arrangement the gear ratio, that is, the speed of the power take-off shaft to that of the gear 1, is in high about 177%, in low 95%, and in reverse about 130%. In Figs. 13 and 14 the transmission gear 13 is on the left side of opening 11. The power take-off shaft is below the center of housing 14. This arrangement of the gear 1 is similar to that shown in Fig. 17 and gives two reverse speeds in the direction shown by the arrow and one opposite or forward speed (Fig. 14).

Figs. 15 and 16 show the power take-off turned upside down from the showing in Figs. 13 and 14 but with the gear arrangement the same as that shown in Fig. 17. In this arrangement the power take-off shaft is above center and the transmission gear 13 is on the right hand side of the opening 11. This arrangement gives two speeds in the direction shown by the arrow and one opposite.

In Fig. 22 the large gear 1 is mounted on the right hand side of shaft 24 so that it meshes with the transmission gear 13. The transmission gear 13 is on the right hand side of opening 11. This necessitates turning gear 2 end for end and positioning it on the left hand side of center, as shown in Fig. 22. In this case the spacer 25 is on the right side of gear 2. Gears 3 and 4 are also turned end for end so that gear 4 will mesh with gear 2a to give forward and gear 4 will mesh with gear 1b to give low reverse, and gear 3 will mesh with gear 1a to give high reverse. The shifter shafts in Fig. 22 are in the same position as in Fig. 12. The two forks are also on the same shafts in Fig. 22 as in Fig. 12 but are turned about. The set screw hole 33 in shaft 31 is slightly off the center line of the power take-off so this enables one to get a different position of the two sliding gears (without using a different fork) which is necessary when changing gears from one shaft to the other. Likewise the two set screw holes 37, 38 in shaft 35 are not equidistant from the center line of the power take-off for the same reason. Note this results in gears 3 and 4 in Fig. 12 being located farther to the left than in Fig. 17 which is O. K. Likewise comparing Figs. 7 and 22, gears 3 and 4 are farther to the right in Fig. 7 which gives the spacing necessary with reference to the gears with which they mesh.

In Figs. 18 through 21 the parts are positioned as shown in Fig. 22. In Figs. 18 and 19 the transmission gear 13 is on the right side of opening 11, the power take-off shaft 17 is below center and the power take-off shaft has two speeds in the direction shown by the arrow and one opposite. In Figs. 20 and 21 the transmission gear 13 is on the left side of the opening 11, the power take-off shaft is above center and the power take-off has been turned upside down from the position shown in Figs. 18 and 19. This gives two speeds in the direction shown and one in the opposite direction.

It is evident from the above description all of these numerous arrangements are possible by simply changing the position of the several gears, shifter shafts, and shifter forks.

I claim:

1. A change speed transmission comprising in combination a housing, a main shaft rotatably mounted in the said housing, two pairs of gears carried by the said housing each pair rotatable about separate parallel axes both of which are equidistant from the longitudinal axis of the main shaft, two separate gears splined on the main shaft, one of which is optionally shiftable into meshing engagement with a gear of either the aforementioned pair of gears and the other of said gears is separately shiftable into mesh with but one gear of one of the aforementioned pair of gears.

2. A change speed transmission comprising in combination a housing, a main shaft rotatably mounted in the said housing, a first and a second pair of gears carried by the said housing each pair rotatable about separate parallel axes both of which are equidistant from the longitudinal axis of the main shaft, two separate gears splined on the main shaft and one of which gears is shiftable into meshing engagement with one gear of said first pair of gears to drive the main shaft at high speed, the other of said gears on the said main shaft being separately shiftable into mesh with the other gear of said first pair of gears to drive the main shaft in the same direction in low and also shiftable into mesh with one of the gears of said second pair of gears to drive the main shaft in the opposite direction of rotation.

3. A change speed transmission comprising in combination a housing, a main shaft mounted in the said housing, a pair of countershafts mounted in the said housing equidistant from the main shaft, a first and a second pair of gears mounted one pair on each of said countershafts and with one gear of said first pair in mesh with one gear of said second pair, the said first and second pairs of gears being interchangeable and the said shafts being removable from said housing whereby either of said first and second pairs of gears can be mounted on one or the other of said countershafts, two independently slidable gears splined on the main shaft one of which is optionally shiftable into mesh with a gear of either of said aforementioned first and second pairs of gears to rotate the said main shaft and the other of which is engageable with one gear of only one of said first and second pairs of gears.

4. A change speed transmission comprising in combination a symmetrical housing, a main shaft journaled in the said housing adapted to be transposed end for end, a pair of shafts removably mounted in the said housing equidistant from the main shaft, a gear mounted on each of said shafts, each gear adapted to be transposed end for end on the said shaft, and one of said gears adapted to serve as a driving gear, a shiftable gear on the main shaft adapted to mesh with one of the aforementioned gears, a shifter fork and shaft shiftably and removably mounted in the said housing and adapted to be transposed end for end whereby when one of said gears is transposed on its shaft the other gears, the main shaft, and the shifter shaft and fork can be transposed end for end and maintain their operative relation with each other.

5. A change speed transmission comprising in combination a symmetrical housing, a main shaft journaled in the said housing adapted to be transposed end for end, a pair of shafts removably mounted in the said housing equidistant from the main shaft, a first pair of gears mounted on one of said shafts and a second pair of gears mounted on the other of said shafts, each pair of gears adapted to be transposed end for end on the said shaft, and one gear of one of said pair of gears adapted to serve as a driving gear, two separately shiftable gears splined on the main shaft one of which is adapted to mesh with a gear of either of said pairs of gears and the other of which is adapted to mesh separately with one gear of one of said pairs of gears, a pair of shifter forks and shiftable shafts slidably and removably mounted in the said housing, symmetrically opposed openings on opposite sides of the center of said housing, opposed grooves in the said shifter shafts, and a locking plunger slidably mounted in one of said openings, and spring and plunger detent mounted in the other of said openings, the said locking plunger and spring detent being interchangeable and interengageable with the grooves in the said shifter shafts.

HOWARD W. SIMPSON.